United States Patent [19]

Gardner et al.

[11] Patent Number: 4,927,459
[45] Date of Patent: May 22, 1990

[54] TREATMENT OF ALUMINUM REDUCTION CELL LININGS COMBINED WITH USE IN ALUMINUM SCRAP RECLAMATION

[75] Inventors: Owen M. Gardner, Oakland, Calif.; Ralph L. Cheek, Tulsa, Okla.

[73] Assignee: Imco Recycling Inc., Dallas, Tex.

[21] Appl. No.: 324,843

[22] Filed: Mar. 17, 1989

[51] Int. Cl.⁵ ............................................. C22B 7/04
[52] U.S. Cl. .................................... 75/685; 423/111; 75/687; 75/672
[58] Field of Search ............... 75/68 R, 68 A, 93 AC, 75/24, 257, 65; 423/111

[56] References Cited

U.S. PATENT DOCUMENTS 4,735,784  4/1988  Davis et al. .......................... 423/111
4,822,388  4/1989  Gee .......................................... 75/24

FOREIGN PATENT DOCUMENTS 1098968  6/1984  U.S.S.R. .................................. 75/24

Primary Examiner—Melvyn J. Andrews
Attorney, Agent, or Firm—Townsend and Townsend

[57] ABSTRACT

Spent potlinings from aluminum reduction cells are fed to an aluminum reclamation furnace as a partial replacement for or supplement to the molten salt flux used in the reclamation process. This rids the spent potlinings of materials which would leach into soil or groundwater if the potlinings were otherwise disposed of at dumpsites, rendering them suitable for dumping with no hazard to the environment. Benefits to the reclamation process may be had at the same by substituting the less expensive potlinings for the salt flux materials and by using the fuel potential of the potlinings to reduce the external fuel requirement.

32 Claims, 1 Drawing Sheet

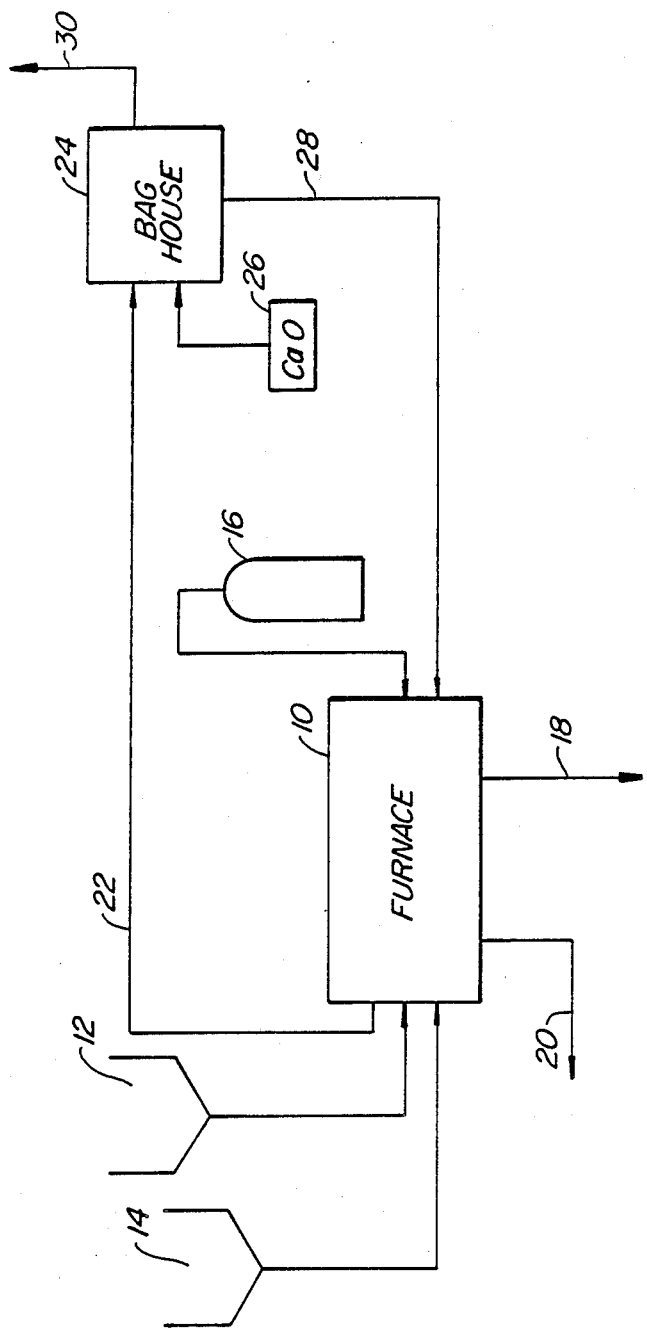
FIGURE

TREATMENT OF ALUMINUM REDUCTION CELL LININGS COMBINED WITH USE IN ALUMINUM SCRAP RECLAMATION

This invention is in the field of aluminum processing, and in particular the fields of aluminum reduction cells and methods of aluminum reclamation involving the use of molten salt flux.

BACKGROUND OF THE INVENTION

The well-known and widely used Hall-Héroult process for the production of aluminum from aluminum oxide has long been a matter of interest if not concern due to the spent potlining which is produced in substantial quantities as a by-product of the process. The cathodic potlining is considered spent when it has either become cracked or so contaminated with cryolite, fluorspar, aluminum fluoride, alumina and other salts and contaminants from the molten bath that it no longer functions efficiently. With a typical volume of 40-60 tons of potlining per cell and a typical potlining life of 3-5 years, the amount of spent potlining generated in the industry is on the order of hundreds of metric tons per year.

Spent potlining presents both a resource in view of its recovery potential and a disposal problem in view of its toxic materials content. The recovery potential resides in both chemical and energy values and is subject to fluctuations in such factors as price, market demand, and other economic considerations. The disposal problem on the other hand is subject to continually increasing regulatory scrutiny and will always be a matter of concern. Primary considerations are the presence of toxic contaminants such as cyanides and fluorides which are susceptible to leaching into soil and groundwater.

The patent literature on spent potlining includes a variety of processes for recovery and disposal. King, U.S. Pat. No. 3,151,934 (Oct. 6, 1964), discloses a process involving crushing of the potlinings followed by treatment with a sodium hydroxide solution to extract fluoridic values and dissolve metallic aluminum. Vodic, U.S. Pat. No. 3,606,176 (Sept. 20, 1971), discloses a process involving crushing followed by mechanical screening to remove the metallic aluminum, then further size reduction and the formation of a salt water slurry. The bulk of the carbon fraction is then separated from the cryolite, alumina and residual aluminum by flotation. In each of these processes, however, environmental hazards remain in the disposal of the carbon discards. A process disclosed by Williams, U.S. Pat. No. 3,635,408 (Jan. 18, 1972), involves a dry steam treatment in a rather complex operation.

More recent processes involve pyrolysis as a means of recovering fluoridic values. See for example Bell, et al., U.S. Pat. No. 4,113,832 (Sept. 12, 1978), Andersen, et al., U.S. Pat. No. 4,158,701 (June 19, 1979), Andersen, et al., U.S. Pat. No. 4,160,808 (July 10, 1979), and Andersen, et al., U.S. Pat. No. 4,160,809 (July 10, 1979). Again, these are complex and costly operations. Further processes include treatment with carbon and aluminum fluoride to remove impurities, as disclosed in Bylund, et al., U.S. Pat. No. 3,528,801 (Sept. 15, 1970); oxidation and agglomeration in a fluidized bed, as disclosed in Roberts, et al., U.S. Pat. No. 4,053,375 (Oct. 11, 1977); incineration followed by caustic leaching, as disclosed in Snodgrass, et al., U.S. Pat. No. 4,444,740 (Apr. 24, 1984); and high temperature treatment with silica addition to form slags, as disclosed in Davis, et al., U.S. Pat. No. 4,735,784 (Apr. 5, 1988).

Still further literature on spent potlining and possibilities for its use includes Spironello, V. R., et al., "An Evaluation of Used Aluminum Smelter Potlining as a Substitute for Fluorspar in Cupola Ironmelting," Report of Investigations—United States Department of the Interior, Bureau of Mines; 8350 (1981); Walkup, P. C., "Presentation Synopsis—Use of Molten Salts to Recover Chemical and Energy From Spent Potlining" (1981), both included in Proceedings of the Workshop on Storage, Disposal and Recovery of Spent Potlining, Dec. 3-4, 1981, Aluminum Association, Inc.; Byers, R. L., et al., "Spent Potlining Update," Journal of Metals, November 1986, pp. 34-38; Blayden, L. C., et al., "Spent Potlining Symposium," Journal of Metals, July 1984, pp. 22-32; Williams, M. M., "Recovery of Values From Metal Skim and Potlinings," Paper No. A72-64, pp. 203-224, The Metallurgical Society of AIME (1972); Augood, D. R., et al., "Potlining Flux in Making Steel," included in published reports of meetings of the Light Metal Committee of The Metallurgical Society of AIME, pp. 1091-1103 (1983).

Further information of possible relevance to the present invention may be found in Evans, U.S. Pat. No. 4,337,929 (July 6, 1982); Ormesher, U.S. Pat. No. 4,486,228 (Dec. 4, 1984); Bauer, et al., U.S. Pat. No. 4,501,614 (Feb. 26, 1985); Ormesher, U.S. Pat. No. 4,518,424 (May 21, 1985); and Viré, U.S. Pat. No. 4,568,430 (Feb. 4, 1986). These patents disclose methods and equipment for the use of molten salt in the reclamation of aluminum from scrap.

SUMMARY OF THE INVENTION

It has now been discovered that spent potlinings can be utilized in aluminum reclamation processes in a manner which will both render the potlinings suitable for disposal and lower the raw material cost and energy requirement for the reclamation process. In accordance with the present invention, spent potlinings are added to or used as partial substitutes for the molten salt flux, and thereby serve either as flux, fuel or both in the reclamation furnace. The reclamation process may otherwise be run as before, the operating conditions normally used for reclamation being sufficient to convert the otherwise leachable contaminants of the spent potlining to gaseous form. This permits their removal from the furnace and the recovery of their chemical values, simultaneously with the recovery of the aluminum.

The invention is of particular utility in the recycling of aluminum beer and beverage can bodies and skim and dross from aluminum foundries and fabrication plant remelt operations. The invention thus offers a major cost saving for the secondary aluminum market in general. With the added benefit of overcoming the spent potliner disposal problem, the invention offers an unusually favorable combination with widespread economic benefits. Further objects, advantages, aspects and embodiments of the invention will be apparent from the description which follows.

BRIEF DESCRIPTION OF THE DRAWING

The attached FIGURE is a flow sheet of a typical plant operation, comprising one example of a method of practicing the present invention.

DETAILED DESCRIPTION OF THE INVENTION AND PREFERRED EMBODIMENTS

Spent potlinings to which the present invention may be applied are carbon structures typically consisting of a mixture of calcined anthracite coal and coal tar pitch binder, the latter having become coked during operation of the reduction cell. The impregnants in the structure which necessitate its replacement and disposal include diverse materials depending on the manner in which the smelting operation was performed and the materials used in the operation. In any event, the present invention extends to the treatment of spent potlinings containing a wide variety of contaminating impregnants. Examples of such impregnants are cryolite ($Na_3AlF_6$), fluorspar ($CaF_2$), calcite ($Caco_3$), lithium fluoride, silicon carbide and other insulating brick materials, metallic sodium, iron and aluminum, oxides of sodium, iron, aluminum, calcium and silicon, sodium aluminum oxides (such as $NaAl_{11}O_{17}$), aluminum carbide, aluminum nitride, sodium fluoride, and free cyanides and iron cyanide complexes.

The potlining is preferably size reduced to maximize the surface area available for contact with the other materials used in the inventiion, and may thus assume a variety of forms, such as for example chunks, briquettes, pellets, or granules. Preferred sizes are those in which the longest dimension of a single piece is approximately 3 inches (7.6 cm) or less, with 0.75 inch (1.9 cm) or less particularly preferred.

The salt flux materials with which the spent potlinings are combined in accordance with the process may be any salt flux composition known in the art for use in aluminum reclamation. The composition of such fluxes vary, and may include a wide range of ingredients including alkali and alkaline earth metal chlorides and fluorides and natural minerals such as cryolite. Alkali and alkaline earth metal chlorides and cryolite are preferred. Among these, sodium chloride, potassium chloride and cryolite either alone or in combination are more preferred, and sodium chloride and potassium chloride are the most preferred. Combinations of sodium and potassium chloride are particularly useful due to the eutectic effect. Of such combinations, those with about 30% to about 75% sodium chloride (on a weight basis), preferably about 40% to about 60% sodium chloride, will give the best results.

The spent potlining material may be added to the salt flux materials as an addition to the quantity of the latter which is normally used in a typical aluminum reclamation, or as a substitute in which it replaces a portion of the salts which would otherwise be used. The amount added or substituted is not critical, and may vary widely. Optimal amounts will depend primarily on economic considerations, such as the amounts of material of each type to be handled and the energy costs, but also on the type and condition of the aluminum scrap to be treated for reclamation in the process. In general, lower proportions of spent potlinings should be used for highly contaminated scrap. In most applications, the proportion of spent potlining to salt flux materials will fall within the range of about 2% to about 75% (on a weight basis), with about 5% to about 50% preferred, and about 20% to about 40% particularly preferred.

The resulting flux mixture, which includes the spent potlining, is combined with the scrap or melting furnace wastes in relative amounts which will likewise reflect both economic considerations and the type and condition of the scrap. In general, relative amounts in which the flux mixture comprises from about 3% to about 90% (weight basis) of the total are preferred, with about 5% to about 70% more preferred, and about 10% to about 60% the most preferred.

The aluminum-bearing waste material or scrap employed in the process may come from a variety of sources, including both industrial waste and consumer waste. Examples of industrial waste are sheet mill scrap such as scalping chips from rolling or cladding operations, and melting furnace waste such as lumps, dross or slag. Prime examples of consumer waste are used beverage cans. Scrap of any kind will frequently include additional materials such as dirt, grit, furnace and plant floor sweepings and dust, and miscellaneous foreign objects. To facilitate the reclamation process, the scrap may be prepared prior to placement in the furnace in a variety of ways, such as for example preheating to remove printing inks and coatings if appropriate, and/or size reduction to briquettes or shredded form to accelerate melting.

The process is generally conducted in a vessel which provides for heating and mixing of the materials in the molten state, and which permits the molten aluminum to settle out as a separate phase underneath the flux and to be drawn off without mixing of the phases. A wide range of process equipment is known in the art and is accordingly suitable for use in the present invention. Heating may occur directly inside the reclamation vessel or in a preheating vessel, by gas-fired or oil-fired burners or by induction or resistance heaters; mixing may occur by agitators or stirrers or by rotation of the vessel itself; and the operation may be done on a batch-wise or continuous basis. The most common processes are batch operations involving the use of a rotary barrel furnace with a removable gas-fired or oil-fired burner that can be of the type generally illustrated in U.S. Pat. No. 4,337,929. Such a furnace would have a capacity of anywhere from 3,000 to 25,000 pounds, depending upon the installation site, gas and oil availability, etc., and provided of course that it is properly housed and connected to appropriate effluent collection and exhaust systems that meet environmental requirements.

When furnaces containing open flames in the furnace interior are used, the spent potlining serves as a fuel supplement due to its carbon content. In such cases, the inclusion of the spent potlining permits one to maintain the desired temperature with the burner running at considerably less than its full capacity. In many cases, burners may be run at 40% to 75% of their capacity, resulting in fuel savings of 15% to 20% or greater. Open-flame furnaces are further preferred for purposes of converting certain otherwise dangerous contaminants in the spent potlinings to harmless gaseous oxides for collection in the flue gases and possible recovery. Cyanides for instance may be converted to carbon oxides and nitrogen oxides.

The operating conditions normally used for salt flux-based reclamation processes without the added spent potlining may be used here as well. The temperature of the operation may vary, depending on the materials used, their relative amounts, the form in which they are supplied, and the degrees of contamination. In most applications, best results are obtained at temperatures ranging from about 1000° F. to about 1700° F. (538° C.-927° C.), preferably about 1200° F. to about 1600° F.

(649° C.–871° C.), and most preferably about 1300° F. to about 1500° F. (704° C.–816° C.).

The contact time of the materials at the operating temperature may also vary, depending on many of the same factors. The contact time should be sufficient to achieve complete melting of those ingredients which will melt at the operating temperature, and to permit the full separation of any aluminum to be reclaimed. Contact times ranging from about ten minutes to about one hour per batch will generally provide the best results.

In selecting the operating conditions and monitoring the process, it is preferable to minimize or avoid viscosity reductions in the flux phase which tend to cause suspended particles to agglomerate. This effect is commonly referred to in the industry as "drying" or "drying out," and is readily detectable by simple observation. The reclamation process can be continued despite the drying, although depending on its degree, the drying will reduce the efficiency of the reclamation. In any event, drying is readily eliminated by charging additional amounts of salts to the flux, as is well known among those skilled in the art.

The process may be conducted in a variety of ways. In batch processes, for instance, a single flux charge may be used repeatedly in sequence without removal of the contaminants. Thus, a single flux charge may be used with several scrap charges or several charges of spent potlining. Likewise, a single spent potlining charge may be used repeatedly to benefit the economics of the reclamation aspect of the process.

Species considered hazardous in the spent potlining are converted by the process of the invention to harmless form or a form suitable for use or disposal. Chlorides and fluorides, for instance, are retained to some extent with the salt flux, which may either be disposed of or separated from the carbonaceous residue of the spent potlining by conventional techniques including evaporation and crystallization. Fluoride values will also be present in the effluent gas, primarily as HF which can be recovered as $AlF_3$ by contact with alumina trihydrate or as aqueous HF by passage through a scrubber followed by conversion to the anhydrous form, if desired, by conventional means. Cyanides are oxidized to $CO_2$ and NO. The NO may then be converted to $Ca(NO_3)_2$ by contact with lime (CaO), and returned to the furnace as a solid where it will be retained with the flux phase in a manner suitable for disposal. The effluent will generally contain a variety of species present as solid fines, which may be recycled to the furnace in the same manner, thereby limiting the gaseous emissions primarily if not entirely to air and carbon dioxide.

Turning now to the FIGURE, a rotary furnace 10 is shown, which, as noted above, may have a 2,000 to 25,000 pound capacity and involves a refractory-lined barrel equipped with a removable gas and oil-fired burner. Charging and emptying of the furnace can be handled in a manner well known in the art. The charged materials include aluminum scrap 12 (such as sheet metal skim or used aluminum containers) and a mixture of salt flux materials (such as sodium and potassium chlorides) and spent potlinings 14. The burner (not shown) is supplied by natural gas 16. Upon completion of the process, the flux phase takes the form of black dross 18, which includes the sodium and potassium chlorides and such components as alumina, sodium fluoride, aluminum chloride, silica, aluminum nitride, aluminum carbide and inerts. The black dross is removed from the furnace and dumped. The aluminum which has settled out to the furnace bottom is separately removed 20, and transferred to aluminum sheet mills.

The gaseous effluent 22 emitted by the furnace contains such components as nitrous oxide, carbon dioxide, alumina, sodium chloride, water vapor and aluminum chloride, plus other ingredients in either gaseous or particulate form. The effluent is passed through a bag house 24 to which is fed a bag coating material 26 comprised of lime. Solids retained on the bags, notably sodium chloride, aluminum chloride, alumina and calcium nitrate, are recovered and recycled 28 to the furnace during operation of the latter for ultimate inclusion in the black dross. Gases 30 emitted to the atmosphere are primarily if not entirely air and carbon dioxide.

The following examples are offered strictly for purposes of illustration, and are not intended either to limit or to restrict the invention in any manner.

EXAMPLE 1

A gas-fired rotary barrel furnace with a capacity of 15,000 pounds was used with the following materials:

Spent potlining, elemental analysis:

| Al | 15% (by weight) |
|----|-----------------|
| C  | 33 |
| F  | 16 |
| Na | 14 |
| CN | 1 |
| Ca | 2 |
| Fe | 1 |
| Si | 2 | form: comminuted to particles ranging in size from +100 mesh up to ¾ inch
amount charged: 320 pounds Aluminum scrap metal:

| | |
|---|---|
| shredded can bodies: | 3004 aluminum, 0.25–1.5 inch (0.6–3.8 cm) in length and width, 0.0045–0.011 inch (0.011–0.03 cm) in thickness |
| shredded can tops: | 5356/5182 aluminum, 0.25–1.5 inch (0.6–3.8 cm) in length and width, 0.010–0.013 inch (0.025–0.033 cm) in thickness |
| total charge: | 10,093 pounds, divided into three equal batches |
| Flux materials: | NaCl: 400 pounds initially, 104 pounds added for third batch |
| | KCl: 538 pounds initially, 324 pounds added for third batch |

The furnace was initially charged with the spent potlining and flux salts. The furnace was then heated to about 1400° F. (760° C.) with an internal gas burner and rotated for about twenty minutes. Then approximately one-third of the shredded scrap metal was added and rotated about thirty minutes to effect a tumbling and mixing of the contents as they melted. The flux and spent potlining materials appeared normal throughout the melting. The gas burner was then shut off and withdrawn from the furnace and the aluminum metal pool having collected at the furnace bottom was drawn off.

A second batch of the aluminum scrap of approximately the same weight as the first was then added to the furnace, and the gas burner relit to raise the temperature once again to about 1400° F. The withdrawal of the first batch and the charging of the second together took about fifteen minutes. The furnace was then rotated as before for thirty minutes, followed by metal removal and a final recharging using the last third of the scrap. At this stage, the operator observed significant agglomeration of solids in the flux mixture. Accordingly, an additional charge of 104 pounds of NaCl and 324 pounds of KCl was made. The furnace was then rotated for a final thirty minutes, after which time the metal layer which formed at the bottom was poured out, leaving a residue consisting of a combination of the salt cake, oxides, the scrap contaminants and the spent potlining.

The combined aluminum pools extracted from the furnace amounted to 87.9% by weight of the scrap metal charged. Exhaust fumes from the furnace were passed through a bag house to eliminate particulate matter, and the bag house emissions were sampled during the process. Analysis of the samples indicated 0.03 ppm cyanide, 3.90 ppm fluoride, and 8.00 ppm chloride, all on a weight basis.

EXAMPLE 2

Materials meeting the description in Example 1 were used in the following amounts:

| Spent potlining: | 320 pounds | |
|---|---|---|
| Shredded beverage cans: | 10,038 pounds, divided into three batches approximately equal in size | |
| Flux materials: | NaCl: | 600 pounds |
| | KCl: | 600 pounds |

The furnace was initially charged with only the NaCl and KCl and one third of the aluminum scrap. The gas burner was lit and the furnace rotated at 1400° F. for thirty minutes as in Example 1. During this time, solids formed and agglomerated in the flux mixture, but in such a low amount the procedure was continued without adding further salts.

Upon completion of this first batch, the second one-third charge of scrap metal was added together with the full amount of spent potlining, all over a period of about fifteen minutes. The furnace was rotated again for thirty minutes at 1400° F., followed by removal of the metal phase and recharging with the final third of the scrap metal. The furnace was rotated again for thirty minutes at 1400° F., followed by removal of the metal phase.

The combined metal phases amounted to 79.7% by weight of the scrap metal charged. Analysis of the bag house emissions indicated 0.03 ppm cyanide, 4.50 ppm fluoride and 8.00 ppm chloride, by weight.

EXAMPLE 3

Materials meeting the description in Example 1 (except that aluminum melting furnace waste was used in place of the aluminum scrap) were used in the following amounts:

| Spent potlining: | 1204 pounds | |
|---|---|---|
| Melting furnace wastes: | 10,204 pounds, divided into four portions | |
| Flux materials: | NaCl: | 1015 pounds initially, 220 pounds added later, followed by 55 pounds |
| | KCl: | 812 pounds initially, 180 pounds added later, followed by 45 pounds |

The initial furnace charge consisted of 1015 pounds of the NaCl, 812 pounds of the KCl and the full 1204 pounds of the spent potlining. After flux meltdown, 2318 pounds of melting furnace wastes (drosses and slag) were added. Melting of the furnace charge proceeded without smoking or fuming as the furnace rotated at 1400° F. for about 25 minutes. Then, without removing the separated metal, 2,738 pounds more of the melting furnace waste was added, and heating and rotation were continued for an additional thirty minutes, during which time siome material appeared to adhere to the furnace wall.

An additional 2448 pounds of the melting furnace waste was then added, again without removing any metal from the furnace, and heating and rotation were resumed. After fifteen minutes, a quantity of separated metal phase amounting to 2,220 pounds was removed. Solids formation and agglomeration in the flux were observed, and an additional 220 pounds of NaCl and 180 pounds of KCl were charged, together with the fourth and final charge of melting furnace waste (2,700 pounds). After a short period of heating and rotation, an additional 55 pounds of NaCl and 45 pounds of KCl were added. Heating and rotation were continued for a final thirty minutes, and the remainder of the separated metal phase was removed.

The combined recovered metal phases amounted to 32.6% of the melting furnace waste charged. Analysis of the bag house emissions indicated 0.32 ppm cyanide, 0.51 ppm fluoride, and 6.00 ppm chloride. In this example, the burner operated at 55% capacity once the initial furnace charge was melted.

The foregoing is offered primarily for purposes of illustration. It will be readily apparent to those skilled in the art that variations, modifications and substitutions in the procedures, conditions, and materials described herein may be made without departing from the spirit and scope of the invention.

What is claimed is:

1. A process for disposing of spent aluminum reduction cell lining material in a manner free of leachable species of such material, said process comprising:
   (a) combining said lining material with salt flux materials to form a flux mixture;
   (b) contacting aluminum-bearing waste material with said flux mixture in molten form to cause aluminum from said aluminum-bearing waste material to separate into a molten aluminum phase substantially free of species other than metallic aluminum, and to convert substantially all leachable species from said lining material to vapor form, leaving a salt phase containing nonvaporized components of said flux mixture and said species from said aluminum-bearing waste material other than metallic aluminum; and
   (c) disposing of said lining material free of said leachable species.

2. A process in accordance with claim 1 in which step (b) is conducted at a temperature of from about 1000° F. to about 1700° F.

3. A process in accordance with claim 1 in which step (b) is conducted at a temperature of from about 1200° F. to about 1600° F.

4. A process in accordance with claim 1 in which step (b) is conducted at a temperature of from about 1300° F. to about 1500° F.

5. A process in accordance with claim 1 in which step (b) is performed in an open-flame furnace.

6. A process in accordance with claim 1 in which step (b) is performed in an open-flame rotary barrel furnace.

7. A process in accordance with claim 1 in which step (a) comprises combining said lining material with said salt flux materials in amounts such that said lining material comprises from about 2% to about 75% of said flux mixture.

8. A process in accordance with claim 1 in which step (a) comprises combining said lining material with said salt flux materials in amounts such that said lining material comprises from about 5% to about 50% of said flux mixture.

9. A process in accordance with claim 1 in which step (a) comprises combining said lining material with said salt flux materials in amounts such that said lining material comprises from about 20% to about 40% of said flux mixture.

10. A process in accordance with claim 1 in which the relative amounts of said flux mixture and said aluminum-bearing waste material in step (b) are such that said flux mixture comprises from about 3% to about 90% of the total thereof.

11. A process in accordance with claim 1 in which the relative amounts of said flux mixture and said aluminum-bearing waste material in step (b) are such that said flux mixture comprises from about 5% to about 70% of the total thereof.

12. A process in accordance with claim 1 in which the relative amounts of said flux mixture and said aluminum-bearing waste material in step (b) are such that said flux mixture comprises from about 10% to about 60% of the total thereof.

13. A process in accordance with claim 1 in which said salt flux materials are comprised of one or more members selected from the group consisting of alkali and alkaline earth metal halides and cryolite.

14. A process in accordance with claim 1 in which said salt flux materials are comprised of one or more members selected from the group consisting of alkali and alkaline earth metal chlorides and fluorides and cryolite.

15. A process in accordance with claim 1 in which said salt flux materials are comprised of one or more members selected from the group consisting of alkali and alkaline earth metal chlorides and cryolite.

16. A process in accordance with claim 1 in which said salt flux materials are comprised of one or more members selected from the group consisting of sodium chloride, potassium chloride and cryolite.

17. A process in accordance with claim 1 in which said salt flux materials are comprised of a member selected from the group consisting of sodium chloride, potassium chloride and a combination of sodium chloride and potassium chloride.

18. A process in accordance with claim 1 in which said salt flux materials are a combination of sodium chloride and potassium chloride.

19. A process in accordance with claim 1 in which said salt flux materials are a combination of sodium chloride and potassium chloride containing from about 30% to about 75% sodium chloride.

20. A process in accordance with claim 1 in which said salt flux materials are a combination of sodium chloride and potassium chloride containing from about 40% to about 60% sodium chloride.

21. A process in accordance with claim 1 in which the aluminum in said aluminum-bearing waste material is in the form of shredded metal.

22. A process in accordance with claim 1 in which said lining material of step (a) is comminuted to pieces whose longest dimension can extend up to about 3 inches.

23. A process in accordance with claim 1 in which said lining material of step (a) is comminuted to pieces whose longest dimension can extend up to about 0.75 inch.

24. A process in accordance with claim 1 further comprising removing solids from vapor generated in step (b), and recycling said solids thus removed to step (b).

25. A process for disposing of spent aluminum reduction cell lining material in a manner free of leachable species of such material, said process comprising:
 (a) combining said lining material with salt flux materials selected from the group consisting of sodium chloride, potassium chloride and a mixture thereof to form a flux mixture of which said lining material comprises from about 5% to about 50% by weight;
 (b) contacting scrap aluminum sheet metal with said flux mixture in molten form in relative amounts such that said flux mixture comprises from about 5% to about 70% by weight of the total, in an open-flame rotary barrel furnace at a temperature of from about 1300° F. to about 1500° F., to cause aluminum from said scrap aluminum sheet metal to separate into a molten aluminum phase substantially free of species other than metallic aluminum, and to convert substantially all leachable species from said lining material to vapor form, leaving a salt phase containing nonvaporized components of said flux mixture and said species from said aluminum-bearing waste material other than metallic aluminum; and
 (c) recovering said lining material from said salt phase for disposal.

26. In a process for recovering aluminum from aluminum-bearing waste material, said process comprising contacting said aluminum-bearing waste material in molten form with a molten salt flux to cause aluminum from said aluminum-bearing waste material to separate into a molten aluminum phase substantially free of nonaluminous species, and recovering said molten aluminum phase for reuse,
 the improvement comprising replacing at least a portion of said molten salt flux in said process with said spent aluminum reduction cell lining material.

27. A process in accordance with claim 26 in which said improvement comprises replacing from about 2% to about 75% of said molten salt flux with said spent aluminum reduction cell lining material.

28. A process in accordance with claim 26 in which said improvement comprises replacing from about 5% to about 50% of said molten salt flux with said spent aluminum reduction cell lining material.

29. A process in accordance with claim 26 in whih said improvement comprises replacing from about 20% to about 40% of said molten salt flux with said spent aluminum reduction cell lining material.

30. A process in accordance with claim 26 in which said lining material is comminuted to pieces whose longest dimension can extend up to about 3 inches.

31. A process in accordance with claim 26 in which said lining material is comminuted to pieces whose longest dimension can extend up to about 0.75 inch.

32. In a process for recovering aluminum from aluminum-bearing waste material, said process comprising contacting said aluminum-bearing waste material in molten form with a molten salt flux at a temperature of from about 1200° F. to about 1600° F. to cause aluminum from said aluminum-bearing waste material to separate into a molten aluminum phase substantially free of nonaluminous species, and recovering said molten aluminum phase for reuse, the improvement comprising replacing from about 5% to about 50% of said molten salt flux in said process with spent aluminum reduction cell lining material comminuted to pieces whose longest dimension is approximately 0.75 inch or less.

* * * * *